United States Patent [19]

D'Alterio

[11] Patent Number: 4,780,329
[45] Date of Patent: Oct. 25, 1988

[54] PASTA RIBBON HAVING ALIGNED SLITS WITH RIPPLED EDGES

[76] Inventor: Joseph C. D'Alterio, 64 Sugar Maple La., Glen Cove, N.Y. 11542

[21] Appl. No.: 98,036

[22] Filed: Sep. 17, 1987

Related U.S. Application Data

[62] Division of Ser. No. 848,623, Apr. 7, 1986, Pat. No. 4,717,328.

[51] Int. Cl.$^4$ ............................ A21C 11/12; A23L 1/16
[52] U.S. Cl. ...................................... 426/557; 426/144; 426/451; 426/496; 426/503
[58] Field of Search ............... 426/557, 144, 502, 503, 426/496, 451

[56] References Cited

U.S. PATENT DOCUMENTS

| | | | |
|---|---|---|---|
| 2,686,720 | 8/1954 | La Rosa | 426/144 |
| 4,166,136 | 8/1979 | Stoll | 426/557 |
| 4,289,470 | 9/1981 | Johnson et al. | 426/336 |
| 4,569,849 | 2/1986 | Codino | 426/144 |
| 4,604,947 | 8/1986 | Pavan | 426/451 |

FOREIGN PATENT DOCUMENTS 0126044  7/1985  Japan .................................. 426/451

Primary Examiner—Donald E. Czaja
Assistant Examiner—Helen Pratt
Attorney, Agent, or Firm—Paul W. Garbo

[57] ABSTRACT

An apparatus for forming an alignment of longitudinally spaced short slits with undulated edges in a sheet of fresh pasta comprises a pair of meshing but noncontacting identical gear-like elements mounted on rotatively driven parallel shafts. Each gear-like element is a pair of identical bevel-toothed disks abutted together so that the tips of the bevel teeth of one disk are opposite the grooves between the teeth of the other disk, the width of the bevel teeth being appreciably less than the width of the grooves. The novel pasta product of the apparatus features an alignment of longitudinally spaced short slits with undulated edges.

8 Claims, 3 Drawing Sheets

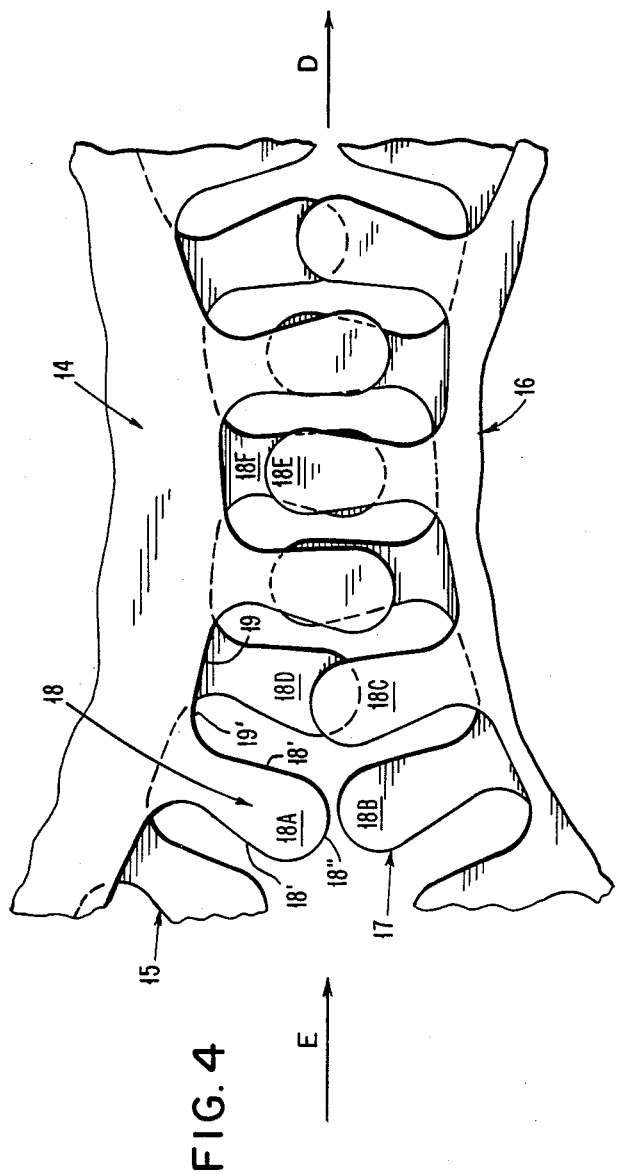
FIG. 4
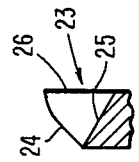
FIG. 6
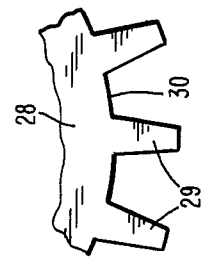
FIG. 7
FIG. 5

PASTA RIBBON HAVING ALIGNED SLITS WITH RIPPLED EDGES

This is a division of application Ser. No. 848,623 filed Apr. 7, 1986, now U.S. Pat. No. 4,717,328, issued Jan. 5, 1988.

This invention relates to means for forming an alignment of longitudinally spaced short slits in a sheet or ribbon of fresh pasta, simultaneously the pasta dough on one side of each slit being pushed above the plane of the pasta ribbon and the pasta dough on the opposite side of the same slit being pushed below the plane of the pasta ribbon. The invention also relates to a novel form of pasta featuring an alignment of longitudinally spaced short slits with a ripple or sinusoidal formation of the pasta on one side of the slits and similar sinusoidal formation of the pasta on the opposite side of the slits, the peaks of one sinusoidal formation being midway between the peaks of the other sinusoidal formation.

As is well known, lasagna is a popular type of pasta in the form of flat, rectangular strips. It is sold in either the completely flat form or the flat form with curly or rippled longitudinal edges. In either form, after the pasta strips have been cooked in boiling water, they are laid in a baking pan as a layer covering the bottom thereof. Tomato sauce is spread as a coating on that layer and ricotta and other cheese is sprinkled on the sauce coating. Another layer of cooked lasagna strips is laid on the coated layer and the application of tomato sauce and cheese on the new layer is repeated. This procedure is continued to build up four or five layers or even more with intervening coatings of tomato sauce and cheese. The baking pan containing the multiple layers of lasagna strips is ready for baking prior to the time when it is to be served.

During baking, care must be taken to prevent the top and bottom lasagna layers from being overbaked or burned while the intermediate layers remain insufficiently baked because of the poor penetration of heat through the stacked layers. Another baking problem is the tendency for steam generated within the stacked layers to accumulate in pockets which separate the layers and deform the lasagna stack. Thus, two difficulties: uneven baking and steam puffing of the lasagna stack can be encountered during the baking.

The baked lasagna is ideally served by cutting through the stacked layers to provide individual portions in the form of cubes or parallelepipeds. Because of the oily tomato sauce between the lasagna layers, often the layers of the individual portion will slide relative to one another so that the desired cube or like portion collapses on the dish as an unattractive heap of random lasagna pieces.

It is therefore a principal object of this invention to provide an improved form of lasagna-type pasta which overcomes the difficulties often encountered in baking multiple layers of the pasta and in cutting individual portions of the baked multi-layered product.

Another important object is to provide simple means for transforming a flat sheet or ribbon of fresh pasta into the improved lasagna-type pasta.

Other features and advantages of the invention will be apparent from the description which follows.

SUMMARY OF THE INVENTION

In accordance with this invention, a sheet or ribbon of fresh pasta is conveyed between a pair of meshing but non-contacting, identical gear-like elements, each element having two identical toothed disks, similar to bevel gears, held together so that the faces of greater diameter of the two disks are in contact with one another and the teeth of one disk are positioned midway between the teeth of the other disk. One gear-like element formed by the two bevel-toothed disks is mounted on a rotatively driven shaft, and an identical gear-like element is mounted on a parallel rotatively driven shaft, the two shafts being spaced from one another so that the top end of the bevel teeth is spaced from the bottom of the grooves between the meshing teeth by a distance approximately equal to the thickness of the fresh pasta teeth passed between the pair of gear-like elements. All of the bevel-type teeth of the four identical disks forming the pair of gear-like elements of this invention are spaced from each other appreciably more than the width of a tooth. Therefore, while the teeth of the two gear-like elements mesh, they never contact one another and for this reason the shafts of the two gear-like elements must be driven. By contrast, a conventional gear on a rotatively powered shaft will automatically rotate a meshing gear on another shaft.

The sheet of fresh pasta passing between the two rotating gear-like elements emerges with an alignment of longitudinally spaced short slits, one edge of each slit having been curved upwardly from the plane of the pasta sheet and the opposite edge of that slit having been curved downwardly from the pasta sheet. Starting with a slit where the right edge is curved upwardly and the left edge is curved downwardly, the adjoining slit will have its right edge curved downwardly and its left edge curved upwardly. This alternating sequence of upward and downward curvature of the edges of the aligned slits continues the full length of the resulting novel lasagna product.

The pair of meshing but noncontacting gear-like elements used to form an alignment of slits with rippled or undulating edges in a fresh pasta sheet will be referred to hereinafter as the slitter-corrugator device or apparatus.

BRIEF DESCRIPTION OF THE DRAWINGS

For a better understanding of the invention, the further description thereof will refer to the accompanying drawings of which:

FIG. 4 is an enlarged partial view of FIG. 1 taken along line 4—4, showing the outer side of the meshing teeth of FIG. 2 together with the adjoining inner side of the meshing teeth of FIG. 3;

FIG. 5 is an enlarged lateral view of a bevel tooth taken along line 5—5 in FIG. 3;

FIG. 6 is a lateral view of a modified bevel tooth similar to that of FIG. 5;

FIG. 7 is an enlarged partial view corresponding to the bottom portion of FIG. 2 but showing a modified form of bevel teeth;

DESCRIPTION OF PREFERRED EMBODIMENTS

Figures 1, 2, 3:
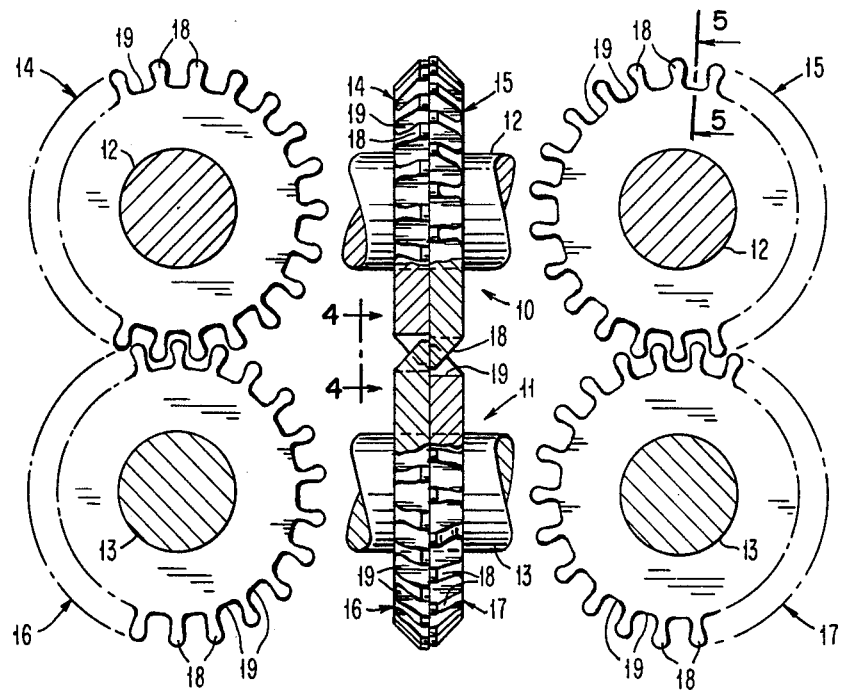
FIG. 1 is an edgewise view, partially sectioned, of a preferred embodiment of the pair of meshing but non-contacting gear-like elements of this invention comprising four identical bevel-toothed disks.
FIG. 2 is a left side view of the two disks on the left half of FIG. 1.
FIG. 3 is a right side view of the two disks on the right half of FIG. 1.

FIG. 1 is an edgewise view of the pasta slitter-corrugator device of this invention, comprising a pair of meshing gear-like elements 10,11 mounted on parallel, rotatable shafts 12,13, respectively. Portions of elements 10,11 are shown in diametrical section to reveal their meshing but noncontacting teeth. Gear-like element 10 is provided by abutting bevel-toothed disks 14,15. Likewise, gear-like element 11 is provided by abutting bevel-toothed disks 16,17.

FIG. 2 shows the outer or exposed faces of disks 14, 16, while FIG. 3 shows the exposed faces of disks 15,17. All four disks 14,15,16,17 are identical. Referring to disk 14 in FIG. 2, it will be seen that it has 22 bevel teeth 18 equally spaced by grooves 19 on the periphery of disk 14.

Disks 14,15 are mounted on shaft 12 so that teeth 18 of disk 14 are aligned with the center of grooves 19 of disk 15, and vice versa. Likewise, disks 16,17 are mounted on shaft 13 so that teeth 18 of disk 16 are aligned with the center of grooves 19 of disk 17, and vice versa. Parallel shafts 12,13 are carefully spaced from one another so that bevel teeth 18 of disks 14,15 do not come closer to the bottoms of grooves 19 of disks 16,17 than approximately the thickenss of the fresh pasta sheet passed between disks 14, 15 and disks 16,17. With parallel shafts 12,13 thus positioned, bevel teeth 18 of disks 16,17 will automatically not come closer to the bottoms of grooves 19 of disks 14,15 than the pasta sheet thickness.

FIG. 4 is an enlarged view of the portion of disks 14,15,16,17 where their teeth are in the meshing but noncontacting position. FIG. 4 shows disks 14,16 backed up by abutting disks 15,17; actually only the inner side or back of bevel teeth 18 of disks 15,17 are visible in FIG. 4. It is clear in FIG. 4 that bevel teeth 18 of this preferred embodiment of the invention are slightly wider at the top than at the base and that sides 18' are rounded where they meet bottom 19' of grooves 19 and where they meet width 18'' of teeth 18.

While the pasta sheet may be passed through the slitter-corrugator apparatus either from the left or the right side of FIG. 4, the description of the cutting action will be based on entry of the pasta sheet at the left side as indicated by arrow E. In such case, disks 16,17 on shaft 13 will be rotated clockwise and disks 14,15 on shaft 12 will be rotated counterclockwise. While both shafts 12,13 must be driven in synchronism so that meshing teeth 18 of disks 14,15,16, 17 hold their relative positions illustrated in FIG. 4, this is simply accomplished by having meshing spur gears on the ends of shafts 12,13 so that rotary power applied to either shaft 12 or 13 will automatically drive the other and the resulting rotation of disks 14,15,16,17 will be synchronized with respect to the desired relative positions of their meshing bevel-teeth 18.

As disks 14,15,16,17 rotate, tooth 18A of disk 14 is about to slide over tooth 18B of disk 17 whereas tooth 18C of disk 16 is already in sliding contact over tooth 18D of disk 15. During rotation of disks 14,15,16,17, the overlapping of teeth 18 increases to a maximum as illustrated by teeth 18E and 18F. Thereafter, meshing teeth 18 begin to slide apart and become disengaged at the start of arrow D which indicates the travel of the pasta sheet discharged by the apparatus after it has formed in the sheet a series of longitudinally spaced slits with undulated edges.

The sliding of one tooth 18 over another as just described is similar to the shearing action of the two blades of scissors and thus each pair of teeth 18 that slide over one another produces a slit in the pasta sheet. Simultaneously, the bevel shape 20 of tooth 18 shown in FIG. 5 pushes the pasta sheet at the edge of the slit out of the plane of the pasta sheet to form a ripple or undulation. Referring to the shearing action illustrated by teeth 18E, 18F, which have produced a slit in the pasta sheet, it will be evident that tooth 18E will push the pasta into a ripple above the plane of the pasta sheet and simultaneously tooth 18F will push the pasta into a ripple below the pasta plane. Thus, the two pasta edges of a slit undulate in opposite directions.

FIG. 5 shows that base line 21 of bevel tooth 18 is at right angles to shearing face 22 of tooth 18 because grooves 19 was cut parallel to the axis of rotation of the toothed disk.

FIG. 6 shows another form of bevel tooth 23 with a bevel shape 24 that is curved at its top. Base line 25 is at an acute angle to shearing face 26 because groove 19 was cut slanted relative the axis of disk rotation.

FIG. 7 shows that disk 28 has bevel teeth 29 and grooves 30 with flat surfaces which meet angularly. Teeth 29 also differ from teeth 18 of FIG. 2 and FIG. 4 in that teeth 29 are slightly narrower at their top than at their base.

Figure 8:
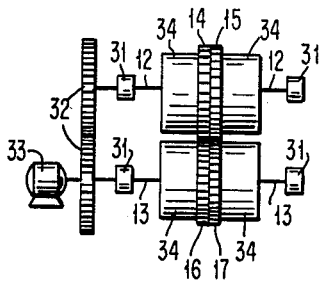
FIG. 8 is a diagrammatic respresentation of the apparatus of this invention.

FIG. 8 diagrammatically shows shaft 12 with disks 14,15 and parallel shaft 13 with disks 16,17 supported by bearings 31. Meshing spur gears 32 are mounted on shafts 12,13 and electric motor 33 is connected to shaft 13. Thus, when electric motor 33 is turned on to rotate shaft 13, the pair of meshing spur gears 32 automatically rotate shaft 12. Preferably, drums or rollers 34 are also mounted on shafts 12,13 abutting disks 14,15,16,17. Rollers 34 help support and guide the ribbon of soft pasta as it passes between disks 14,15,16,17. While rollers 34 are illustrated as smooth cylinders, their surface may be serrated or corrugated so that the portions of the pasta ribbon passed between them will issue with serrations or corrugations extending the full length of the pasta ribbon.

Figure 9:
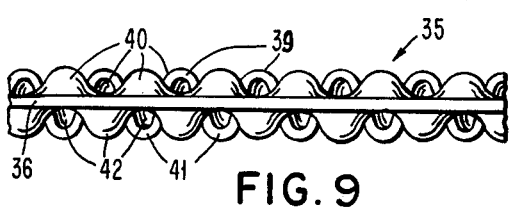
FIG. 9 is a side view along the length of a pasta ribbon which has passed through the apparatus of FIG. 8.
Figure 10:
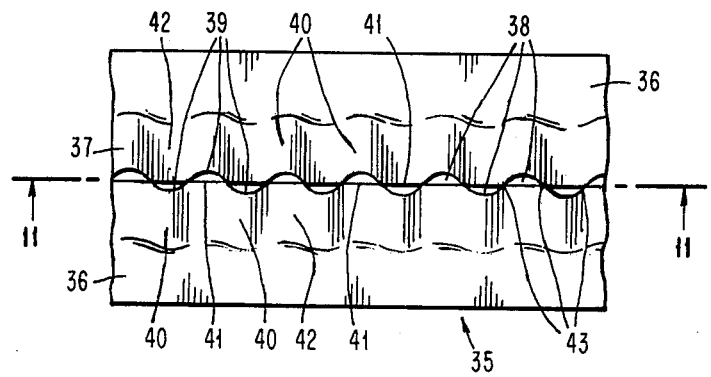
FIG. 10 is a top view of the pasta ribbon of FIG. 9.
Figure 11:
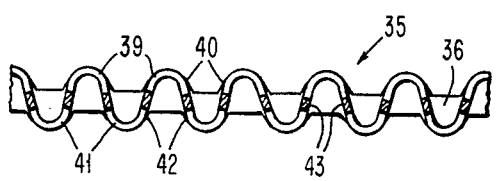
FIG. 11 is a sectional view taken along the line 11—11 of FIG. 10.

FIGS. 9,10,11 show a ribbon of fresh pasta which has passed through the apparatus of this invention. Pasta ribbon 35 has two lateral edge portions 36 which are flat, and central portion 37 which comprises the allignment of longitudinally spaced short slits 38 with edges 39 pushed or deformed into ripples 40 above edge portions 36 and with opposite slit edges 41 deformed or shaped into ripples 42 below edge portions 36. FIGS. 9,10 show that at each slit 38 an upper ripple 40 is opposite a lower ripple 42 and along the length of pasta ribbon 35 upper ripples 40 alternate with lower ripples 42 to form a sinusoidal wave which is clearly evident in FIG. 11. Slits 38 in FIG. 10 are separated from one another by small links 43 of uncut pasta. FIG. 11 is a section through links 43 which clearly are the only connections or ligaments holding the two halves of pasta ribbon 35 together.

In a specific example of the invention, each of the fours disks 14,15,16,17 is a Delrin (TM) plastic disk 0.375 inch thick with a diameter of 3.312 inches to the ends of teeth 18. Each disk has twenty-two teeth 18 equally spaced from one another by grooves 19 having a 0.312 inch width. The outer face of each disk has a 2.930 inch diameter and 0.03125 inch inward from the outer face, the bevel of each tooth 18 rises at an angle of 34° while groove 19 dips to the inner or abutted face of the disk at a 30° angle. The widest upper part of each tooth 18 measures 0.142 inch and the narrowest lower part measures 0.075 inch. Hence, the widest part of tooth 18 is slightly less than half of the width of groove 19. Each tooth 18 is 0.39 inch long from its tip to the bottom of groove 19 at the inner or shearing face of the disk. Each disk has a central bore of 1.125 inch diameter for mounting on a shaft of that diameter.

As an example of the novel lasagna-type product, pasta ribbon 35 is 2.25 inches wide and 0.052 inch thick in flat lateral portions 36. The center-to-center distance between the peaks of adjacent ripples 40 or 42 is 0.375 inch while the distance between the peak of ripple 40 is the peak of its opposite ripple 42 is 0.235 inch. Slit 38 is about 0.125 inch long. Obviously, the original flat thickness (0.052 inch) of the pasta ribbon was increased by passage through the apparatus of this invention 4.5 times (0.235 inch) at the center of the ribbon along the alignment of undulated slits.

Of course, the invention permits appreciable variation from the foregoing examples. The diameter of the bevel-toothed disks is usually in the range of 1 to 6 inches, preferably 2 to 4 inches. In most cases, the disk thickness is about 0.25 to 0.60 inch. Generally, the number of bevel teeth increases as the disk diameter increases. The number of bevel teeth rarely is outside the range of 5 to 60, preferably 10 to 35 teeth. For any given disk diameter, say 2.8 inches, varying the number of bevel teeth, for example from 12 to 18, will produce attractive variations of the novel lasagna-type pasta. The widest portion of a bevel tooth is usually about 30% to 50% of the width of the groove between bevel teeth, the groove width being generally in the range of 0.25 to 0.50 inch. Each bevel tooth should be from about 0.25 to about 0.50 inch long at its shearing face. The bevel angle of the teeth is usually in the range of 25° to 50° whereas the bottom of the groove between teeth may be parallel to, or at an angle relative to, the axis of disk rotation as much as about 45°.

Fresh pasta sheet fed to the slitter-corrugator apparatus of this invention may have the conventional thickness in the broad range of 0.025 to 0.090 inch, more frequently 0.040 to 0.060 inch. The center-to-center distance between the peaks of adjacent ripples may vary from about 0.3 to 0.7 inch, often not more than 0.5 inch. The distance between the peaks of opposite ripples will generally be in the range of 0.1 to 0.3 inch, preferably 0.15 to 0.25 inch. The slit length is rarely less than about 0.1 inch or more than 0.3 inch.

The bevel-toothed disks of this invention may be made of any material which will not contaminate the fresh pasta sheet contacted thereby. Metals such as stainless steel may be used but plastics such as Delrin (TM) and Nylon (TM) are preferred in order to reduce the cost of the disks.

Referring to FIG. 8, it is desirable to have bearings 31 of shaft 12 which is not directly coupled to motor 33 mounted in tracks so that shaft 12 can be moved slightly toward, or away from, shaft 13. Such adjustability permits variation of the maximum amount of overlapping of the teeth during the shearing of the pasta sheet to produce the short slits therein. In FIG. 4, teeth 18E and 18F are at the position of maximum overlap which, as there illustrated, is about 65% of the length of the teeth. By moving shaft 12 slightly away from shaft 13, the maximum overlap of the teeth will be reduced, while moving shaft 12 toward shaft 13 will increase the maximum overlap of the teeth. In most practical operations of the apparatus of this invention, the distance between shafts 12 and 13 is varied so that the desired maximum overlap of the shearing teeth is in the range of 25% to 70% of the length of the teeth at their shearing face. Shafts 12 and 13 can be brought closer together to increase the maximum overlap of the shearing teeth to an extent that the short slits become a single continuous slit in the pasta ribbon. In short, by increasing the overlap of the shearing teeth, the gear-like elements of the invention can also be used to slit a fresh pasta sheet and both edges of the slit will have an attractive undulated shape.

Variations and modifications of the invention will be apparent to those skilled in the art. For instance, the two parallel shafts of FIG. 8 may be long enough to mount thereon two or more pairs of meshing but non-contacting gear-like elements with rollers filling the axial space between the pairs of gear-like elements. In such case, a wide pasta sheet may be passed through the apparatus to form therein two or more alignments of spaced, short slits with wavy edges. Also, while one disk is usually positioned relative to its abutted disk so that every bevel tooth is opposite the center of a groove, a slight deviation from such centering of the teeth can change the sinusoidal wave formation in the pasta ribbon shown in FIG. 9 and FIG. 11 into an asymmetrical but still attractive undulation. Accordingly, only such limitations should be imposed on the scope of the invention as are set forth in the appended claims.

What is claimed is:

1. The novel lasagna-type pasta product in the form of a ribbon having an alignment of longitudinally spaced short slits with undulated edges, the opposite edges of each of said slits being undulated on opposite sides of said ribbon, and said undulated edges on each of the opposite sides of said alignment of said slits forming a substantially sinusoidal wave.

2. The novel pasta product of claim 1 wherein the distance between the peaks of the undulated opposite edges of each slit is in the range of 0.1 to 0.3 inch.

3. The novel pasta product of claim 1 wherein the distance from the center of each undulation to the center of the next undulation on the same side of the ribbon is in the range of 0.3 to 0.7 inch.

4. The novel pasta product of claim 1 wherein the length of each slit is in the range of 0.1 to 0.3 inch.

5. The novel pasta product of claim 4 wherein the distance between the peaks of the undulated opposite edges of each slit is in the range of 0.15 to 0.25 inch, and the distance from the center of each undulation to the center of the next undulation on the same side of the ribbon is not more than 0.5 inch.

6. The novel pasta product of claim 2 wherein the distance from the center of each undulation to the center of the next undulation on the same side of the ribbon is in the range of 0.3 to 0.7 inch.

7. The novel pasta product of claim 6 wherein the length of each slit is in the range of 0.1 to 0.3 inch.

8. The novel pasta product of claim 2 wherein the distance from the center of each undulation to the center of the next undulation on the same side of the ribbon is not more than 0.5 inch.

* * * * *